(12) United States Patent
Saha et al.

(10) Patent No.: US 11,461,657 B2
(45) Date of Patent: Oct. 4, 2022

(54) DATA AUGMENTATION IN TRAINING DEEP NEURAL NETWORK (DNN) BASED ON GENETIC MODEL

(71) Applicant: FUJITSU LIMITED, Kawasaki (JP)

(72) Inventors: Ripon Saha, Santa Clara, CA (US); Xiang Gao, Singapore (SG); Mukul Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 817 days.

(21) Appl. No.: 16/409,443

(22) Filed: May 10, 2019

(65) Prior Publication Data

US 2020/0356863 A1    Nov. 12, 2020

(51) Int. Cl.
| | |
|---|---|
| *G06N 3/02* | (2006.01) |
| *G06N 3/08* | (2006.01) |
| *G06N 3/04* | (2006.01) |
| *G06F 7/58* | (2006.01) |
| *G10L 15/16* | (2006.01) |
| *G06K 9/62* | (2022.01) |
| *G06F 17/18* | (2006.01) |

(52) U.S. Cl.
CPC ............... *G06N 3/086* (2013.01); *G06F 7/58* (2013.01); *G06F 17/18* (2013.01); *G06K 9/6267* (2013.01); *G06N 3/0472* (2013.01); *G10L 15/16* (2013.01)

(58) Field of Classification Search
CPC ...... G06N 3/086; G06N 3/0472; G06N 3/006; G06N 3/0445; G06N 3/0454; G06N 3/088; G06F 7/58; G06F 17/18; G06K 9/6267; G06K 9/6256; G06K 9/6271; G10L 15/16

USPC ........................................................... 706/15
See application file for complete search history.

(56) References Cited

U.S. PATENT DOCUMENTS

2020/0183339 A1\*  6/2020  Shi ........................ G06N 3/0454

OTHER PUBLICATIONS

Image Reprocessing, ImageDataGenerator class, Keras Documentation, <URL:https://keras.io/preprocesing/image> Retrieved on May 10, 2019 (14 pages).

(Continued)

*Primary Examiner* — Charlotte M Baker
(74) *Attorney, Agent, or Firm* — Fujitsu Patent Center

(57) ABSTRACT

According to an aspect of an embodiment, operations may include selecting, from a training dataset, a first data point as a seed data point. The operations may further include generating a population of data points by application of a genetic model on the seed data point. The population of data points may include the seed data point and a plurality of transformed data points of the seed data point. The operations may further include determining a best-fit data point in the generated population of data points based on application of a fitness function on the generated population of data points. The operations may further include executing a training operation on the DNN based on the determined best-fit data point. The operations may further include obtaining a trained DNN for the first data point based on the training operation on the DNN based on the determined best-fit data point.

20 Claims, 7 Drawing Sheets

(56) References Cited

OTHER PUBLICATIONS

Krizhevsky, Alex et al., "ImageNet Classification with Deep Convolutional Neural Networks", Advances in neural Information processing systems, 2012 (9 pages).
Nada, Hajime et al. "Pushing the Limits of Unconstrained Face Detection: a Challenge Dataset and Baseline Results", arXiv preprint arXiv:1804.10275 (2018), (10 pages).
Engstrom, Logan et al. "A Rotation and a Translation Suffice: Fooling CNNs with Simple Transformations." arXiv preprint arXiv:1712.02779 (2017), (18 pages).

* cited by examiner

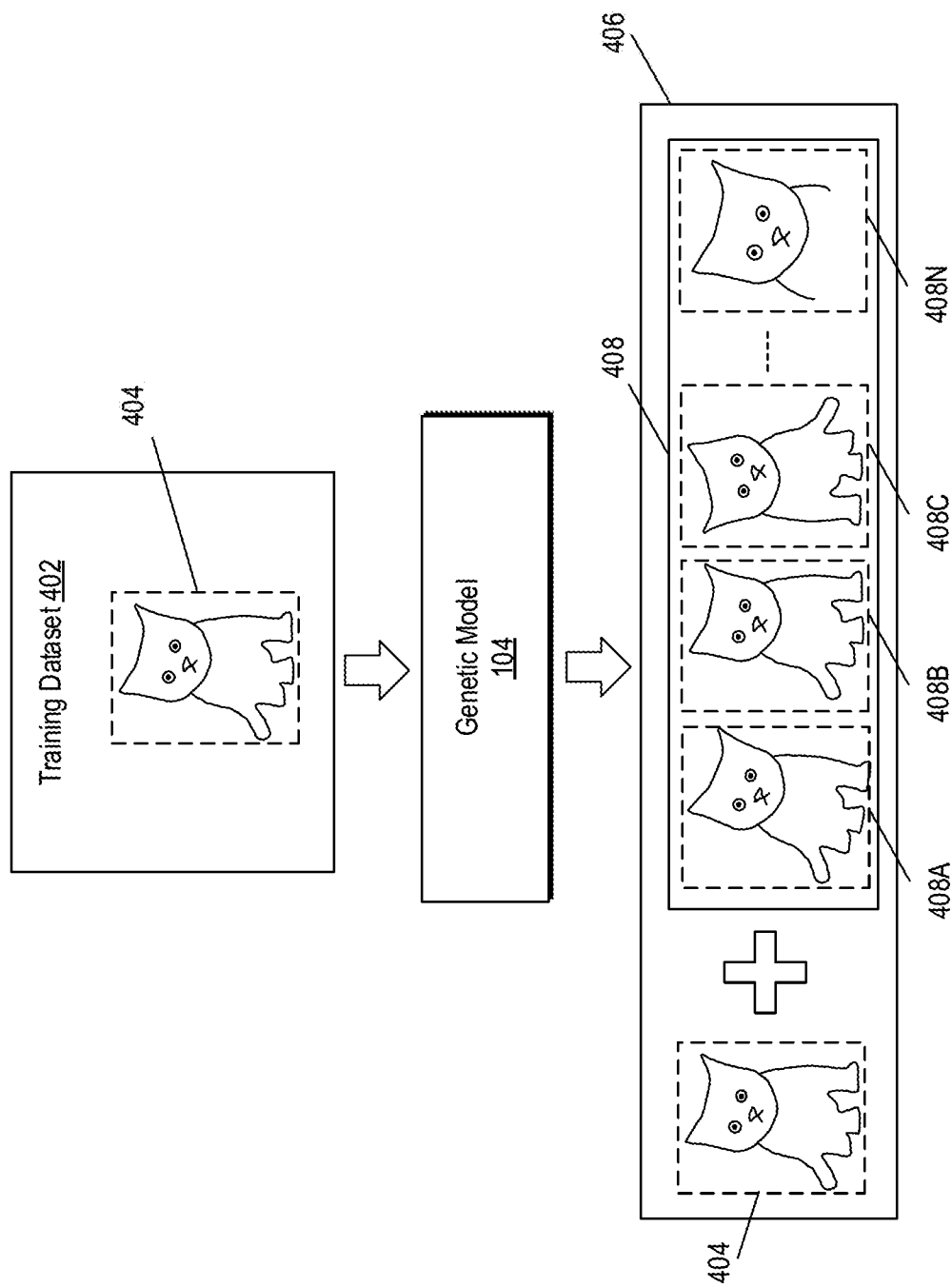

DATA AUGMENTATION IN TRAINING DEEP NEURAL NETWORK (DNN) BASED ON GENETIC MODEL

FIELD

The embodiments discussed in the present disclosure are related to data augmentation in training a deep neural network (DNN) based on genetic model.

BACKGROUND

Recent advancements in the field of neural networks have led to development of various techniques for training a deep neural network (DNN). A trained DNN may be utilized in different applications for various classification tasks. For example, the trained DNN may be used to classify or detect different data points (i.e. an image). Typically, to increase the accuracy of classification or detection tasks, the DNN has to be augmented and trained with different data points and various realistic variations (for example rotation, scaling, zoom, etc) associated with each data point. In certain conventional systems, the systems were trained with limited number of random variations of data points, which affected their accuracy to perform the classification tasks for all possible variations. In other conventional systems, the training for all possible variations were executed, however the training time in such situation was substantially high because of substantial increase in the size of training dataset. The training time constraints further limits the system or developers to apply many variations. Thus, an advanced system may be desired which can provide large number of realistic variations for data augmentation such that the DNN can be trained efficiently as well as achieves an improved accuracy for various classification or detection applications.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include selecting, from a training dataset of a plurality of data points which may be associated with a real-time application, a first data point as a seed data point. The operations may further include performing a set of first operations for training a Deep Neural Network (DNN) for a specific classification task of the real-time application. The performing of the set of first operations may include generating a population of data points by application of a genetic model on the selected seed data point. The population of data points may include the selected seed data point and a plurality of transformed data points of the selected seed data point. The performing of the set of first operations may further include determining a best-fit data point in the generated population of data points based on application of a fitness function on each data point in the generated population of data points. The performing of the set of first operations may further include executing a training operation on the DNN based on the determined best-fit data point and reselecting the determined best-fit data point as the seed data point. The operations may further include obtaining a trained DNN by iteratively performing the set of first operations for a plurality of epochs based on the reselected seed data point.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 illustrates an exemplary scenario to depict transformed data points generated based on the genetic model;

DESCRIPTION OF EMBODIMENTS

Figure 1:
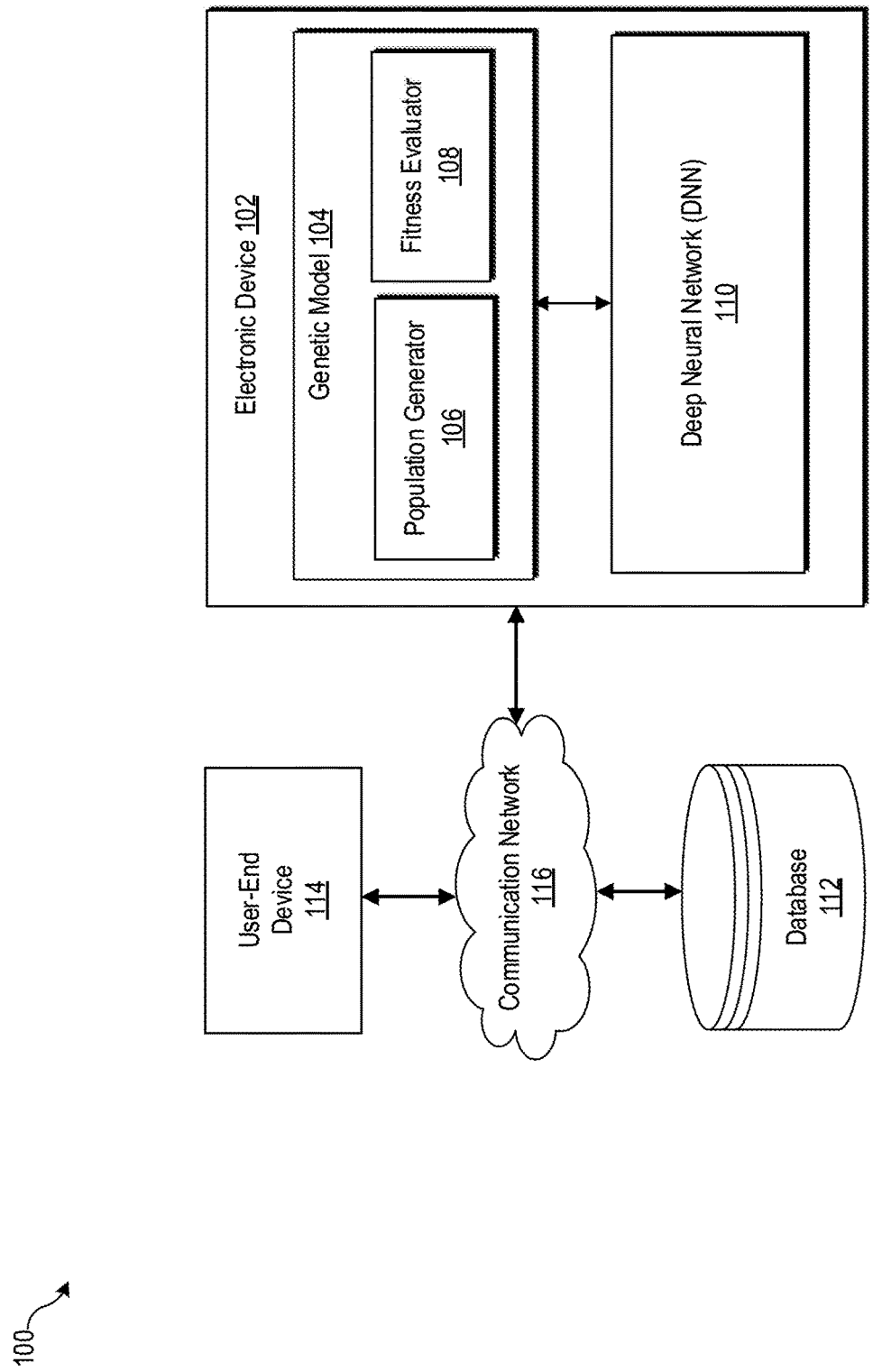
FIG. 1 is a diagram representing an example environment related to data augmentation in training a deep neural network (DNN) based on a genetic model.

Some embodiments described in the present disclosure relate to methods and systems for effective data augmentation in training a deep neural network (DNN) based on a genetic model. The genetic model in the present disclosure achieves identification of realistic and optimal variations (i.e. best-fit variations) of training data over a sequence of epochs. These realistic and optimal variations of training data are augmented again with the training data in successive epochs for training the DNN efficiently. In the present disclosure, the identification of the realistic variations of the training data based on the genetic model achieves efficient training time of the DNN and further improves an accuracy of the trained DNN for various classification tasks.

According to one or more embodiments of the present disclosure, the technological field of deep learning may be improved by configuring a computing system in a manner in which the computing system is able to achieve an effective data augmentation based on a genetic model for training a deep neural network (DNN). The genetic model based data augmentation may provide identification of suitable and optimal variations of training dataset, based on which the trained DNN provides the classification with an improved accuracy as compared to conventional DNN based classification systems.

The system may be configured to receive a training data point for training the DNN. Example of the training data point may include, but is not limited to image data, speech data, audio data, text data, or other forms of digital signals. The system may be further configured to generate a population of data points based on application of a genetic model on the received training data point for a particular epoch of training the DNN. The population of data points may include different realistic variations (i.e. of the received training data point) generated genetically. For example, the realistic variations for the image data may be, but are not limited to, rotation, translation, shear, zoom, brightness, or contrast. Different examples of the realistic variations for different types of data points are mentioned in Table 1.

Additionally, in some embodiments, the system may be further configured to determine a best or optimal variation from the generated realistic variations in the population and control the training of the DNN on the determined best variation in the particular epoch. The system may be further configured to select the determined best variation as new training data point for next epoch of the training of the DNN. Thus, replacing the original training data point with its genetic mutant for training the DNN in next subsequent epochs.

The system may be further configured to determine a new population of data points based on application of the genetic model on the new training data point (i.e. best variation of the training data determined in last epoch of training the DNN). Similarly, the system may be further configured to determine the best variation from the newly generated population to train the DNN in each epoch, and consider the determined best variation (as genetic mutant) to generate another population in next epoch. The system may be configured to perform aforementioned operations for a pre-defined number of epochs in training of the DNN based on the genetically generated best variations of the training data points. Thus, based on the generation of the best, realistic, and/or optimal variations genetically in each epoch and utilizing the generated best variation for training the DNN and further generation of the population (or the best variation) in next epoch, the disclosed system provides more robust training of the DNN with an improved accuracy of data classification. Further, due to the predefined number of epochs for training the DNN based on the best and realistic variations, the training time of the disclosed system is also practically controlled.

Embodiments of the present disclosure are explained with reference to the accompanying drawings.

FIG. 1 is a diagram representing an example environment related to data augmentation in training a deep neural network (DNN) based on a genetic model, arranged in accordance with at least one embodiment described in the present disclosure. With reference to FIG. 1, there is shown an environment 100. The environment 100 may include an electronic device 102. The electronic device 102 may include a genetic model 104 which further includes a population generator 106 and a fitness evaluator 108. The electronic device may further include a deep neural network (DNN) 110. The environment 100 may further include a database 112, a user-end device 114, and a communication network 116. The electronic device 102, the database 112, and the user-end device 114 may be communicatively coupled to each other, via the communication network 116.

Examples of the electronic device 102 may include, but are not limited to, a mobile device, a desktop computer, a laptop, a computer work-station, a training device, a computing device, a mainframe machine, a server, such as a cloud server, and a group of servers. In one or more embodiments, the electronic device 102 may include a user-end terminal device and a server communicatively coupled to the user-end terminal device. Examples of the user-end terminal device may include, but are not limited to, a mobile device, a desktop computer, a laptop, and a computer work-station.

The electronic device 102 may comprise suitable logic, circuitry, and interfaces that may be configured to perform one or more operations for data augmentation based on a genetic model for training a deep neural network (DNN). The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

In one or more embodiments, the electronic device 102 may be configured to receive a training dataset for training the DNN 110. The electronic device 102 may be configured to receive the training dataset from the database 112, via the communication network 116. In some embodiments, the electronic device 102 may be configured to store the training dataset in a memory (not shown in FIG. 1) of the electronic device 102. The training data set may include a plurality of data points. Each of the data points may correspond to, but is not limited to, image data, audio data, speech data, or text data. The training data set may correspond with a real-time application which may perform, but is not limited to, a specific classification task. Examples of the real-time application may include, but are not limited to, an image recognition or classification, a speech recognition, a text recognition, a malware detection, an anomaly detection, a machine translation, pattern recognition from different digital signals, such as, but not limited to, electrical bio signals, motion data, and depth data.

The electronic device 102 may be configured to train the DNN 110 with the training data set such that the trained DNN 110 may perform the classification task accurately. For example, the electronic device 102 may train the DNN 110 with different images (as training dataset) and different variations of each image such that the trained DNN 110 may correctly classify or detect each input image or its variations.

In these or other embodiments, the electronic device 102 may be configured to train the DNN 110 for a predefined number of epochs. For example, the predefined number of epochs may be, but is not limited to, 30 or 50. The electronic device 102 may be configured to train the DNN 110 for the predefined number of epochs for each data point in the training dataset. In some embodiments, the predefined number of epochs may depend on the data point or the real-time application.

The electronic device 102 may be configured to select a data point as a seed data point from the plurality of data points in the training set. The electronic device 102 may be further configured to control the population generator 106 to generate a population of data points based on applying the genetic model 104 on the selected seed data point in a particular epoch of training the DNN 110. The generated population may include the selected seed data point and a plurality of transformed data points (as variations of the seed data point). For example, in case of an image data point, the transformed data points, may include, but are not limited to, a rotated image, a translated image, a zoomed image, or a sheared image. Each of the transformed data point may be within a range of transformation values predefined for a particular variation. The details of the transformed data points are described in detail, for example, in FIGS. 3, 4, and 5. In some embodiments, the electronic device 102 may control the genetic model 104 to generate the population of data points following an evolutionary approach, where successive generations/populations of data points are obtained from a best-fit data point which is selected based on a fitness of data points in preceding generation/population of data points.

The electronic device 102 may be further configured to control the fitness evaluator 108 of the genetic model 104 to determine a best-fit data point in the generated population of data points based on evaluating a fitness function for each data point in the population of data points. The best-fit data point may be an optimal or best transformed data point (or variation) in the generated population of data points.

In some embodiments, the electronic device 102 may be further configured to control the training of the DNN 110 for the determined best-fit data point in the particular epoch. The electronic device 102 may be further configured to reselect the determined best-fit data point (i.e. optimal variation of the seed data point determined in current epoch) as a new seed data point for next epoch of training the DNN 110. The electronic device 102 may iteratively perform, for the predefined number of epochs, the generation of the population of data points genetically based on the reselected seed data point, determination of the best fit-data point from the population, and control the training of DNN 110 based on the determined best-fit data point to obtain a trained DNN. The trained DNN may perform the classification or detection tasks of the real-time application with improved accuracy due to being trained with optimal and best-fit transformed data points associated with realistic variations of the training dataset.

The genetic model 104 may comprise suitable logic, circuitry, interfaces, and/or code that may be configured to control the population generator 106 to generate the population of data points based on the input seed data point. Additionally or alternatively, the genetic model 104 may be implemented using hardware including a processor, a microprocessor (e.g., to perform or control performance of one or more operations), a field-programmable gate array (FPGA), or an application-specific integrated circuit (ASIC). In some other instances, the genetic model 104 may be implemented using a combination of hardware and software.

The genetic model 104 may include, but is not limited to, a mutation operator or a crossover operator. The population generator 106 may comprise suitable logic, circuitry, interfaces, and/or code that may be configured to generate the population of data points based on the application of one of the mutation operator or the crossover operator on the seed data points in the plurality of epochs to train the DNN 110. Additionally or alternatively, the population generator 106 may be implemented using hardware including a processor, a microprocessor (e.g., to perform or control performance of one or more operations), a field-programmable gate array (FPGA), or an application-specific integrated circuit (ASIC). In some other instances, the population generator 106 may be implemented using a combination of hardware and software.

In some embodiments, the genetic model 104 or the population generator 106 may be configured to store a plurality of predefined ranges of transformation values for different realistic variations for various type of data points (for example image, speech, text). The genetic model 104 or the population generator 106 may be further configured to randomly select a transformation value from the corresponding predefined range of the realistic variations to generate the plurality of transformed data points as the population. The details of the predefined ranges and the genetically generation of the population may be described in detail, for example, in FIGS. 3-5.

The fitness evaluator 108 may comprise suitable logic, circuitry, interfaces, and/or code that may be configured to determine the best-fit data point (i.e. optimal transformed data point or variation) in the population of data points generated by the population generator 106. Additionally or alternatively, the fitness evaluator 108 may be implemented using hardware including a processor, a microprocessor (e.g., to perform or control performance of one or more operations), a field-programmable gate array (FPGA), or an application-specific integrated circuit (ASIC). In some other instances, the fitness evaluator 108 may be implemented using a combination of hardware and software.

In some embodiments, the fitness evaluator 108 may be further configured to determine a most lossy data point in the generated population as a best-fit data point. In another embodiment, the fitness evaluator 108 may be configured to determine a data point with best structural neural network coverage in the DNN 110 to determine the best-fit data point in the population of data points generated by the population generator 106. The details of determining the most lossy data point and the best structural neural network coverage may be described in detail, for example, in FIG. 3. Although in FIG. 1, the population generator 106 and the fitness evaluator 108 are separated; however, in some embodiments, the population generator 106, and the fitness evaluator 108 may be integrated as a single device in the genetic model 104, without a deviation from the scope of the disclosure.

The deep neural network (DNN) 110 may comprise suitable logic, circuitry, interfaces, and/or code that may configured to classify or recognize the input data point to generate an output result for the particular real-time application. For example, a trained DNN may recognize different objects in input images and may provide a unique label for each object in the input images. The unique label may correspond to different living (like human, animals, plants) or non-living entities (like vehicle, building, computer, book, etc.). In another example, a trained DNN 110 related to an application of speech recognition, may recognize different input audio samples to identify a source (e.g., a human-speaker) of the audio sample. The DNN 110 may be implemented using hardware including a processor, a microprocessor (e.g., to perform or control performance of one or more operations), a field-programmable gate array (FPGA), or an application-specific integrated circuit (ASIC). In some other instances, the DNN may be a code, a program, or set of software instruction. The DNN 110 may be implemented using a combination of hardware and software.

In some embodiments, the DNN 110 may correspond to multiple recognition layers (not shown) for recognition of the input data points, where each successive layer may use an output of a previous layer as input. Each recognition layer may be associated with a plurality of neurons, each of which may be further associated with plurality of weights. During training, the DNN 110 may be configured to adjust weights based on the input data points and the output result (i.e. a ground truth) of the DNN 110. Examples of the DNN 110 may include, but are not limited to, a recurrent neural network (RNN), a artificial neural network (ANN), a convolutional neural network (CNN), a CNN-recurrent neural network (CNN-RNN), R-CNN, Fast R-CNN, Faster R-CNN, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks.

The database 112 may comprise suitable logic, interfaces, and/or code that may be configured to store the training dataset to be used by the electronic device 102 for training the DNN 110. The database 112 may be a relational or a non-relational database that include the training dataset. Also, in some cases, the database 112 may be stored on a server, such as a cloud server or may be cached and stored on the electronic device 102. The server of the database 112 may be configured to receive a request to provide the training dataset from the electronic device 102, via the communication network 116. In response, the server of the database 112 may be configured to retrieve and provide the training dataset to the electronic device 102 based on the received request, via the communication network 116. In some embodiments, the database 112 may be configured to receive and store the best-fit data points and the population of data points generated by the electronic device 102. In some embodiments, the database 112 may be configured to store the trained DNN for the particular real-time applications. Additionally or alternatively, the database 112 may be implemented using hardware including a processor, a microprocessor (e.g., to perform or control performance of one or more operations), a field-programmable gate array (FPGA), or an application-specific integrated circuit (ASIC). In some other instances, the database 112 may be implemented using a combination of hardware and software.

The user-end device 114 may comprise suitable logic, circuitry, interfaces, and/or code that may be configured to store the real-time application where the specific classification task, for which the DNN 110 is trained, may be performed. In some embodiments, the user-end device 114 may deploy the DNN 110, which may be trained based on the best-fit transformed data points or realistic variations of the data points genetically produced by the electronic device 102. The user-end device 114 may utilize the deployed DNN 110 to perform the classification or detection task of the real-time application. For example, the user-end device 114 may be an electronic device which may receive an input image from an in-built camera or a server and may perform the image classification or recognition on the input image based on the trained DNN 110 deployed on the user-end device 114. In another example, the user-end device 114 may be an autonomous vehicle which may receive real-time images from surrounding and detect different objects captured in the images through in-built trained DNN 110. In another example, the user-end device 114 may be audio security system which may perform user authentication based on speech recognition performed by the DNN 110 trained on different speech data samples. It should be noted here that the aforementioned examples are not be construed as limiting for the disclosure and the DNN 110 may be trained for many possible applications which have not been mentioned for the sake of brevity. Examples of the user-end device 114 may include, but are not limited to, a mobile device, a desktop computer, a laptop, a computer workstation, a computing device, a mainframe machine, a server, such as a cloud server, and a group of servers.

The communication network 116 may include a communication medium through which the electronic device 102 may communicate with and the server which may store the database 112 and the user-end device 114. Examples of the communication network 116 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 116, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 112 and the user-end device 114. In addition, in some embodiments, the functionality of each of the database 112 and the user-end device 114 may be incorporated into the electronic device 102, without a deviation from the scope of the disclosure.

Figure 2:
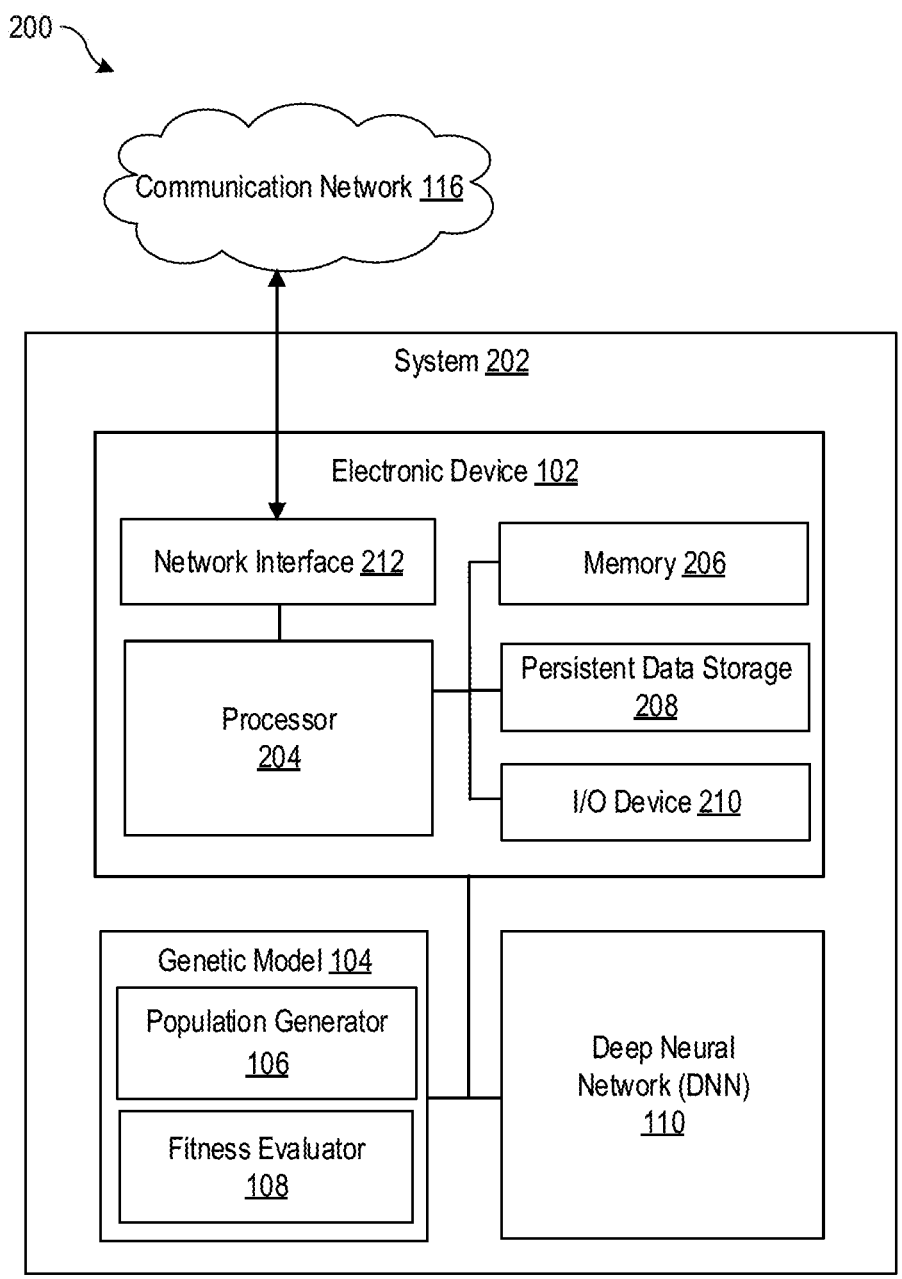
FIG. 2 is a block diagram of an example system for data augmentation in training a deep neural network (DNN) based on a genetic model.

FIG. 2 is a block diagram of an example system for data augmentation in training a deep neural network (DNN) based on a genetic model, arranged in accordance with at least one embodiment described in the present disclosure. FIG. 2 is explained in conjunction with elements from FIG. 1. With reference to FIG. 2, there is shown a block diagram 200 of an example system 202. The example system 202 may include the electronic device 102, the genetic model 104, the fitness evaluator 108, and the DNN 110. The electronic device 102 may include a processor 204, a memory 206, a persistent data storage 208, an input/output (I/O) device 210, and a network interface 212.

The processor 204 may comprise suitable logic, circuitry, and/or interfaces that may be configured to execute program instructions associated with different operations to be executed by the electronic device 102. For example, some of the operations include reception of the training dataset including a plurality of data points, generation of the population of data points, determination of the best-fit data point in each epoch, and training of the DNN 110. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, and/or interfaces that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, and/or interfaces that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the genetic model 104, the fitness evaluator 108, and the DNN 110 as software instructions. The processor 204 may fetch the software instructions related to the genetic model 104, the fitness evaluator 108, and the DNN 110 to perform different operations of the disclosed electronic device 102. In some embodiments, either of the memory 206, the persistent data storage 208, or combination may store the training dataset to be trained. In some embodiments, the realistic variations of different data points (i.e. image, audio, text, etc.) and different predefined ranges of transformation values for each realistic variation may be stored in the either of the memory 206, the persistent data storage 208, or combination.

The I/O device 210 may include suitable logic, circuitry, interfaces, and/or code that may be configured to receive a user input. The I/O device 210 may be further configured to provide an output in response to the user input. For example, I/O device 210 may receive a handwritten text as the user input from a user and the received user input may be used for training the DNN 110 or recognized based on the trained DNN 110.

The I/O device 210 may include various input and output devices, which may be configured to communicate with the processor 204 and other components, such as the network interface 212. Examples of the input devices may include, but are not limited to, a touch screen, a keyboard, a mouse, a joystick, and/or a microphone. Examples of the output devices may include, but are not limited to, a display and a speaker.

The network interface 212 may comprise suitable logic, circuitry, interfaces, and/or code that may be configured to establish a communication between the electronic device 102, the database 112, and the user-end device 114, via the communication network 116. The network interface 212 may be implemented by use of various known technologies to support wired or wireless communication of the electronic device 102 via the communication network 116. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the example system 202 without departing from the scope of the present disclosure. For example, in some embodiments, the example system 202 may include any number of other components that may not be explicitly illustrated or described for the sake of brevity.

Figure 3:
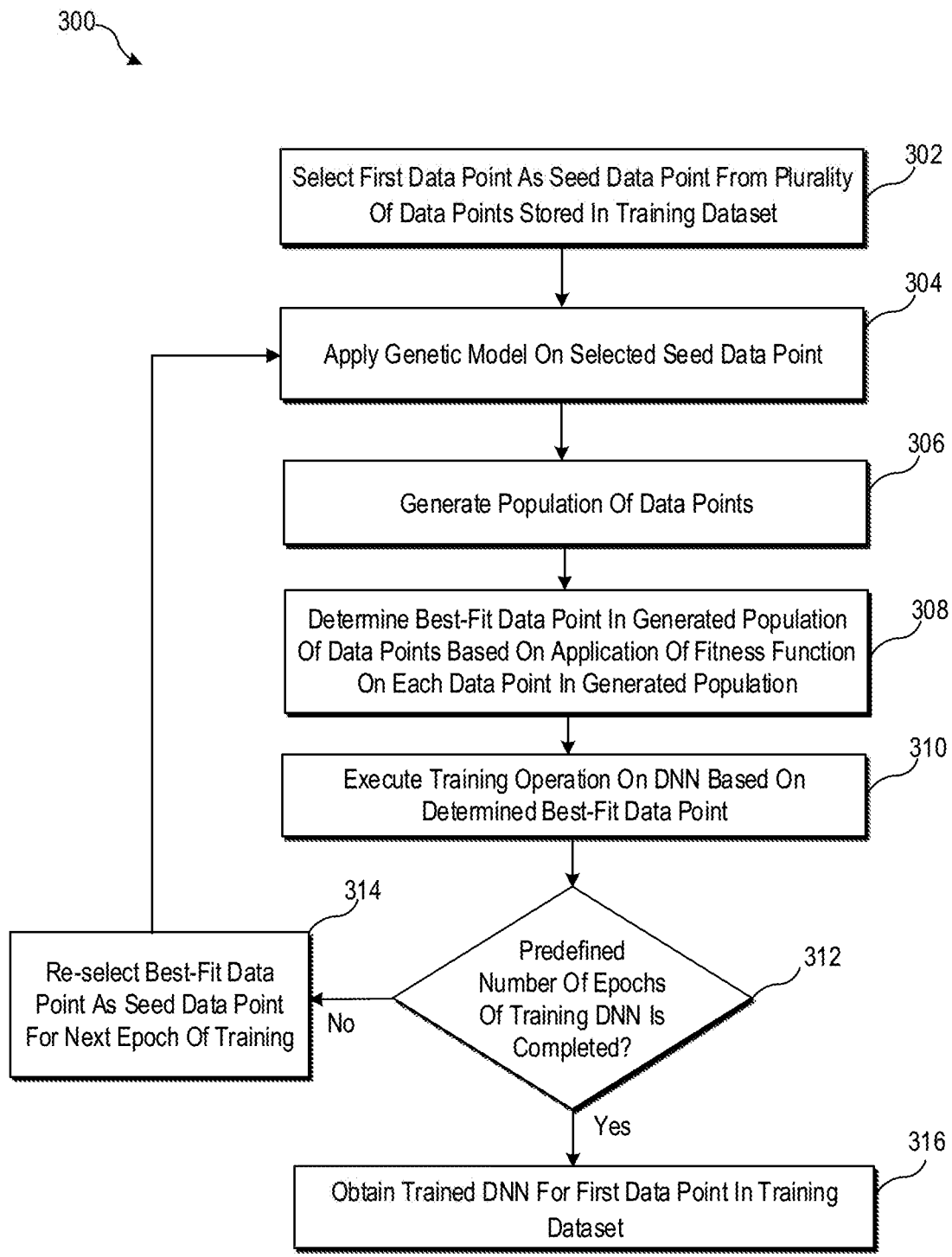
FIG. 3 is a flowchart of an example method for data augmentation in training deep neural network (DNN) based on a genetic model.

FIG. 3 is a flowchart of an example method for data augmentation in training deep neural network (DNN) based on a genetic model, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the example electronic device 102 of FIG. 1 or the example system 202 of FIG. 2. For example, one or more of the electronic device 102, the genetic model 104, the population generator 106, the fitness evaluator 108, and the DNN 110 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a first data point may be selected as a seed data point from a plurality of data points stored in a training dataset. The training dataset or the plurality of data points may be associated with a real-time application. For example, a plurality of data points may include, but are not limited to, images, audio/speech samples, text characters, software instructions, or other forms of digital signals, such as but not limited to, electrical bio-signals, motion data, or depth data. Example of the real-time applications may include, but are not limited to, an image recognition application, an image classification application, a speech recognition application, a text recognition application, a malware detection application, an autonomous vehicle application, an anomaly detection application, a machine translation application, or pattern recognition application from digital signals/data.

In some embodiments, the processor 204 may be configured to select the first data point (for example, an image) from the plurality of data points in the training dataset that may be stored in either or combination of the memory 206, the persistent data storage 208, or the database 112. The processor 204 may select the first data point, for training the DNN 110 on the first data point and its realistic variations generated genetically by the genetic model 104.

At block 304, a genetic model may be applied on the selected seed data point. In one or more embodiments, the processor 204 may be configured to control the genetic model 104 to apply the genetic model on the selected seed data point. The genetic model 104 may be configured to apply either or combination of a mutation genetic operation or a crossover genetic operation (as part of the genetic model) on the selected seed data point. In some embodiments, the genetic model 104 may be configured to apply a transformation vector (Tc) associated with a plurality of realistic variations on the selected seed data point. The plurality of realistic variations may correspond to a type of the seed data point on a real-time basis.

Examples of realistic variations for different types of data points are presented in Table 1, as follows:

TABLE 1

Realistic Variations

| Type of data point | Realistic Variations |
|---|---|
| Image | Rotation, Horizontal translation, Vertical translation, Shear, Zoom, Brightness, Contrast, Color, Flip, Sharpness |
| Speech | Rate-of-speech, Loudness, Type of ambient noise, Pitch, Tone, Tempo, Intonation, Voice Quality, Phonetic, Pronunciation |
| Text | Font-Size, Font-Type, Rotation, Font-Color, Background-Color, Texture |

In some embodiments, the transformation vector (Tc) applied on the first seed data point may correspond to one transformation. The genetic model 104 may be configured to apply the transformation vector (Tc) on the seed data point to generate a transformed data point. The transformation vector (Tc) may include a plurality of transformation values, where each transformation value in the transformation vector (Tc) may be an integer value and correspond to a realistic variation of the plurality of realistic variations related to the type of the data point to be trained. In some embodiments, each transformation value may lie within a range of values predefined for the corresponding realistic variation. Examples of the predefined ranges for the realistic variations related to image as the data point are presented in Table 2, as follows:

TABLE 2

Range of transformation values for realistic variations for Image data point

| Type of Data Point | Realistic Variation | Predefined Ranges for Transformation Values to Apply Genetic model |
|---|---|---|
| Image | Rotation | −30 degree to +30 degree |
| | Horizontal Translation | −3 pixels to +3 pixels |
| | Vertical Translation | −3 pixels to +3 pixels |
| | Shear | −0.1 to +0.1 |
| | Zoom | −0.9 to 1.1 |
| | Brightness | −32 to +32 |
| | Contrast | 0.8 to 1.2 |

The predefined range of transformation values presented in Table 2 are merely an example. However, the different realistic variations for different types of data points may have different predefined ranges for various real-time applications, without departing from the scope of the present disclosure. Predefined ranges for other types of data points (like speech or text) have been omitted from the disclosure for the sake of brevity.

For example, a first transformation value of the transformation vector (Tc) may correspond to a rotation operation of an image. Similarly, a second transformation value, a third transformation value, a fourth transformation value, a fifth transformation value, a sixth transformation value, and a seventh transformation value of the transformation vector (Tc) may correspond to a horizontal translation/shift operation, a vertical translation/shift operation, a shear operation, a zoom operation, a brightness modification operation, and a contrast modification operation for the image (as the data point) respectively.

For example, in case the first transformation value is "+1", the genetic model 104 may be configured to rotate the seed data point (e.g. image) by "1" degree in a predefined direction (for example, a clockwise direction). In another example, in case the second transformation value of the transformation vector (Tc) is "+2", the genetic model 104 may be configured to horizontally translate the seed data point (i.e. a seed image) by "2" pixels in a predefined direction (for example right). In an embodiment, a size of the transformation vector (Tc) may be a number of operations to be executed on the selected data point based on the corresponding transformation value in the transformation vector (Tc).

In some embodiments, the genetic model 104 may be configured to apply each transformation value of the transformation vector (Tc) to the selected seed data point (for example, an image) to generate a transformed data point. For example, in case the transformation vector (Tc) indicates [2, 1, 0, 0, 0, −2, 0], then the genetic model 104 may rotate the seed image by "2" degrees in the predefined direction of rotation, horizontally translate the seed image by "1" pixel in the predefined direction of translation, and decrease the brightness of each pixel by two brightness values (e.g. "2" nits) to generate a transformed image or the transformed data point. Thus, the application of the transformation vector (Tc) may be an execution of one or more realistic variations operations on the data point. This execution of one or more operations defined by the transformation vector (Tc) may correspond to one transformation applied on the data point to generate the transformed data point. The execution of multiple variation operations may be referred as a composite transformation.

In some embodiments, the genetic model 104 may be configured to generate the transformation values of the transformation vector (Tc) randomly before applying the transformation vector (Tc) on the data point. The application of the randomly generated transformation vector (Tc) on the selected seed data point may be referred as the mutation genetic operation or the crossover genetic operation of the genetic model 104. However, the transformation vector (Tc) in the crossover genetic operation may be generated based on predefined crossover between transformation values of multiple transformation vectors. The details of the crossover operation of the genetic model 104 is described in detail, for example, in FIGS. 5A-5B. Thus, the genetic model 104 generates the transformed data point (as genetic mutant) of the selected seed data point.

At block 306, a population of data points may be generated. In some embodiments, the processor 204 may be configured to control the genetic model 104 or the population generator 106 to generate the population of data points. The population of data points may include a plurality of transformed data points generated based on applying multiple transformation vectors on the selected seed data point. The generation of the plurality of transformed data points based on applying multiple transformation vectors on the selected seed data point, is described in detail, for example, in FIGS. 5A-5B. In some embodiments, a number of the plurality of data points in the generated population or a size of the generated population may be predefined.

In some embodiments, each transformation vector applied on the selected seed data point may be randomly generated before the generation of one transformed data point to be included in the plurality of transformed data points. Each transformation value in each generated transformation vector (Tc) may lie within the predefined range as mentioned in the Table 2 (for example for image as data point). In some embodiments, during subsequent generation of multiple transformed data points, the transformation vector (Tc) may be generated in a manner such that a total or an absolute transformation value may still lie with the predefined range corresponding to the realistic variation. For example, in case at the time of generation of a first transformed data point, the seed image is rotated by "5" degrees, then at the time of generation of a second transformed data point, a transformation value for rotation may be randomly generated such that the total or absolute rotation may still lie within the predefined range of transformation values of the rotation as the realistic variation. A population of data points for an exemplary image as the seed data point is depicted in FIG. 4, as an example.

At block 308, a best-fit data may be determined from the generated population of data points. In some embodiments, the processor 204 may be configured to control the fitness evaluator 108 of the genetic model 104 to determine the best-fit data point from the generated population of data points based on application of a fitness function on each data point of the generated population of data points. In some embodiments, the fitness evaluator 108 may be configured to determine most lossy data point, as the best-fit data point, in the generated population of data points. To determine the most lossy data point, the fitness evaluator 108 may input each data point in the generated population to the DNN 110.

The fitness evaluator 108 may be further configured to calculate an output value (for example an output probability value) for each data point input to the DNN 110. In some embodiments, the fitness evaluator 108 may extract or read the output value from the DNN 110 for each data point input to the DNN 110. The fitness evaluator 108 may be further configured to calculate an error value from the calculated output value of the DNN 110 for each data point input to the DNN 110. For example, in case the output value of the DNN 110 for a particular input data point is "0.2", then the error value may be "0.8" (say as the output probability value). Thus, the fitness evaluator 108 may calculate a plurality of error values based on the size of the generated population of data points.

The fitness evaluator 108 may be further configured calculate a most lossy data point in the generated population based on the calculated plurality of error values. In some embodiments, the fitness evaluator 108 may consider a data point, as the most lossy data point, for which the DNN 110 provides highest error value (a lowest output value) among all the error values related to all data points in the generated population.

The fitness evaluator 108 may be configured to consider the best-fit data as the most lossy data point in the generated population of data points. The best-fit data point may correspond to that transformed data point which produced worst output value or probability output value in the DNN 110. In some embodiments, the fitness evaluator 108 may determine a structural neural network coverage (for example neuron coverage) of the DNN 110 when each data point of the generated population is input in the DNN 110. The structural neural network coverage for an input data input may be a ratio of unique number of activated neurons to a total numbers of neurons in the DNN 110. The fitness evaluator 108 may determine the structural neural network coverage for each data point in the generated population. In some embodiments, the fitness evaluator 108 may consider a data point in the generated population as the best-fit data point for which the structural neural network coverage may be highest among all the structural neural network coverages determined for all the data points input to the DNN 110. The best-fit data point determined based on the structural neural network coverage may be a data point which may be accurately recognized by the DNN 110 once trained. Thus, the processor 204 be configured to control the fitness evaluator 108 to determine the best-fit data point in the generated population, as the most lossy data point or with highest structural neural network coverage. The determined best-fit data point may be used for actual data augmentation to the training data used for training the DNN 110.

At block 310, a training operation may be executed on the DNN 110 based on the determined best-fit data point. In some embodiments, the processor 204 may input the determined best-fit data point in the generated population to the DNN 110. The DNN 110 may be trained on the determined best-fit data point. The training on the best-fit data point (i.e. either as most lossy transformed variation or best neuron coverage transformed variation of the seed data point) may enhance the accuracy of the trained DNN 110. The training of the DNN 110 is described in detail, for example, in FIG. 6.

At block 312, it may be determined whether the predefined number of epochs of training the DNN 110 are completed. In some embodiments, the processor 204 may be configured to determine whether the predefined number of epochs of training the DNN 110 are completed. In cases, the predefined number of epochs are completed, the control passes to block 316. Otherwise, the control passes to block 314.

At block 314, the determined best-fit data point in the generated population may be re-selected as the seed data point for next epoch of training of the first data point in the training dataset. In some embodiments, the processor 204 may be configured to reselect the best-fit data point (i.e. determined in current epoch) as the seed data point for the next epoch. The control passes to the block 304.

In one or more embodiments, the processor 204 may be configured to iteratively execute the operations from block 304 to the block 314 for the predefined number of epochs such that the DNN 110 is trained on the first data point of the training data set and different transformed data points associated with various realistic variations of the first data point. As per aforementioned features, the disclosed electronic device 102 or the processor 204, may be able to identify the best-fit transformed data point (i.e. which may be most lossy or with best neuron coverage) of the seed data point in one epoch and further focus to identify other best-fit data points in subsequent epochs based on the best-fit data point identified in previous epochs of training the DNN 110. All the identified best-fit data points in the plurality of epochs may be used for the data augmentation based training of the DNN 110. Thus, the DNN 110 may be trained in the predefined number of epochs, on either (or both) of several worst or best variations of a particular data point in the training set. This may enhance accuracy of the DNN 110 to recognize and/or output correct classification values (e.g., likelihood values) for the first data point and its several variations.

At block 316, a trained DNN 110 may be obtained for the first data point in the training dataset. In one or more embodiments, the processor 204 may be configured to execute features of block 302 to 316 to train the DNN 110 on the plurality of data points in the training dataset. The Control may pass to end.

Although the flowchart 300 is illustrated as discrete operations, such as 302, 304, 306, 308, 310, 312, 314, and 316. However, in certain embodiments, such discrete operations may be further divided into additional operations, combined into fewer operations, or eliminated, depending on the particular implementation without detracting from the essence of the disclosed embodiments.

FIG. 4 illustrates an exemplary scenario to depict transformed data points generated based on the genetic model, arranged in accordance with at least one embodiment described in the present disclosure. FIG. 4 is explained in conjunction with elements from FIG. 1, FIG. 2, and FIG. 3. With reference to FIG. 4, there is shown a training dataset 402. The training dataset 402 may be stored in either or combination of the memory 206, the persistent data storage 208, or the database 112. The training dataset 402 may include the first data point 404 based on which the DNN 110 may have to be trained. In FIG. 4, the first data point 404 as the image data (i.e. cat image) is merely an example. Although, the training dataset 402 may include the plurality of data points including the first data point 404, and may include other types of data points, such as audio data, text data, or other digital signals.

In FIG. 4, there is also shown the genetic model 104. As described in FIG. 3, the processor 204 may be configured to control the genetic model 104 or the population generator 106 to generate a population of data points based on application of the transformation vectors on the first data point as the seed data point to generate the population of data points. In FIG. 4, there is also shown a population of data points 406 generated by the genetic model 104 as described in FIGS. 3 and 5. The population of data points 406 may include the first data point 404 (i.e. seed data point) and a plurality of transformed data points 408.

The plurality of transformed data points 408 may be realistic variations (genetically generated) of the first data point 404 as the seed data point. The plurality of transformed data points 408 may include, but is not limited to, a first transformed data point 408A, a second transformed data point 408B, a third transformed data point 408A, and a $N^{th}$ transformed data point 408N, where N may be a predefined size of the population of data points. For example, the first transformed data point 408A may be a rotated image (say rotated by certain degrees defined by corresponding transformation value of the first data point 404). The second transformed data point 408B may be a horizontally translated image (say horizontally shifted by certain pixels defined by corresponding transformation value of the first data point 404). For example, the third transformed data point 408C may be flipped image of the first data point 404. The Nth transformed data point 408N may be zoomed image (say zoomed based on corresponding transformation value of the first data point 404).

Figure 5A:
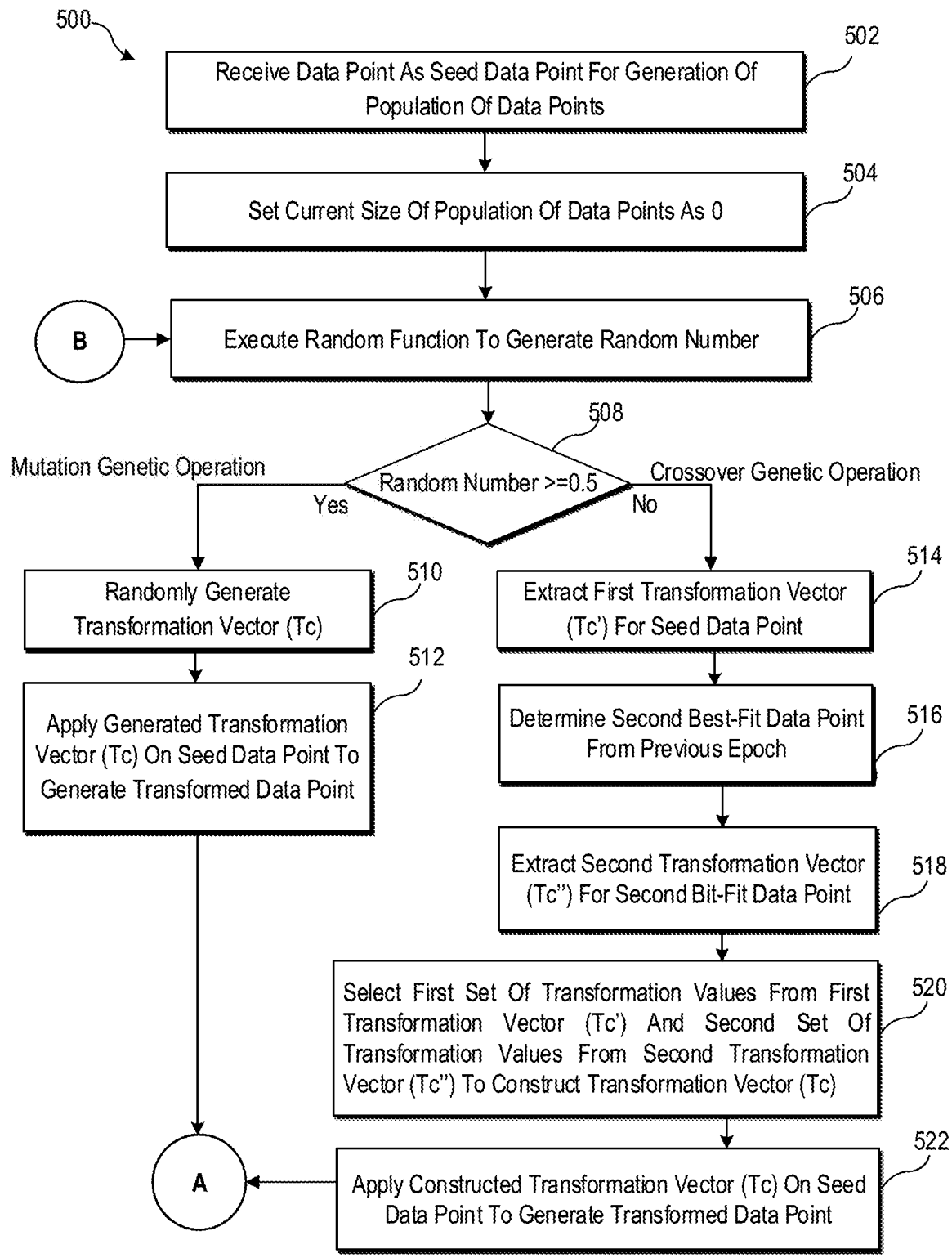
FIGS. 5A and 5B collectively illustrates a flowchart of an example method for generating a population of data points based on a mutation genetic operation and a crossover genetic operation of the genetic model.
Figure 5B:
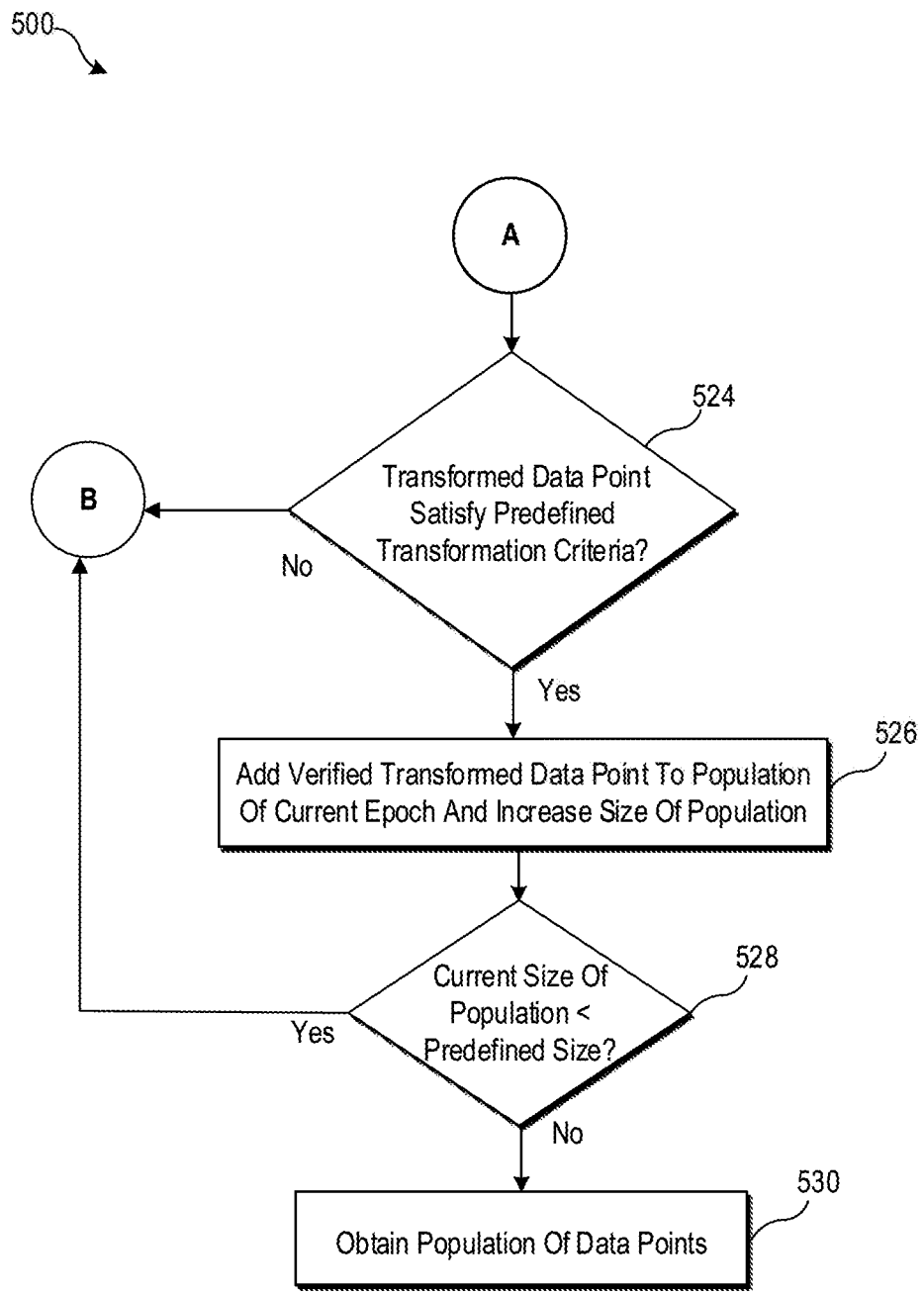

FIGS. 5A and 5B collectively illustrates a flowchart of an example method for generating a population of data points based on a mutation genetic operation and a crossover genetic operation of a genetic model, according to at least one embodiment described in the present disclosure. FIGS. 5A-5B are explained in conjunction with elements from FIG. 1, FIG. 2, FIG. 3, and FIG. 4. With reference to FIGS. 5A-5B, there is shown a flowchart 500. The method illustrated in the flowchart 500 may start at 502 and may be performed by any suitable system, apparatus, or device, such as by the example electronic device 102 of FIG. 1 or by example system 202 of FIG. 2. For example, one or more of the electronic device 102, the genetic model 104, the population generator 106, the fitness evaluator 108, and the DNN 110 may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 502, a data point may be received as the seed data point for generation of the population of data points. In some embodiments, the processor 204 may be configured to receive the data point as the seed data point for the generation of the population of data points. In some embodiments, the data point may be received as the first data point from the training dataset, as described in FIGS. 3 and 4. In another embodiment, the data point may be received as the seed data point from previous epoch. In such a case, the data point may the best-fit data point selected as the seed data point from a previous epoch of training the DNN 110, as described in FIG. 3. The processor 204 may be configured to receive the data point as the seed data point to generate the population of data points by applying the genetic model 104 on the seed data point, as described in detail, for example, in block 304 of FIG. 3.

At block 504, a current size of the population of data points may be set as "0". In some embodiments, the processor 204 may be configured to set the current size of the population to zero before initiating the generation of the population.

At block 506, a random function may be executed to generate a random number from the random function. In some embodiments, the processor 204 may be configured to execute one or more random functions to generate the random number (for example a probability value that varies between 0 to 1).

At block 508, it may be determined whether the generated random number is equal to greater than "0.5" (as example). In some embodiments, the processor 204 may be configured to determine whether the generated random number is equal to greater than "0.5". In cases where the generated random number is lesser than "0.5", the control passes to block 514. Otherwise, the control passes to 510. Based on the determination of the random number, the processor 204 may be configured to determine which particular genetic operation has to be applied on the selected seed data point received in the block 502. For example, when the random number is less than "0.5", then the processor 204 may execute the crossover genetic operation described in blocks 514 to 522. In another case, when the generated random number is greater or equal to 0.5, then the processor 204 may execute the mutation genetic operation on the selected seed data point, as described in blocks 510 to 512.

It may be noted that the value of the random number considered for the determination in block 508 is merely an example. In certain situations, or real-time application, the value of the random number may vary for the determination, without departing from the scope of the present disclosure.

At block 510, the transformation vector (Tc) may be randomly generated. The transformation vector (Tc) may be associated with the plurality of realistic variations as described in Table 1 for different types of data points. In some embodiments, the processor 204 may be configured to control the genetic model 104 to randomly generate the transformation vector (Tc) for the plurality of realistic variations of the selected seed data point. The transformation vector (Tc) may include the plurality of transformation values, where each transformation value in the transformation vector (Tc) may be an integer value and correspond to a realistic variation of the plurality of realistic variations. Each transformation value in the generated transformation vector (Tc) may lie within the range of values predefined for the corresponding realistic variation, as described, for example, in Table 2 for image as the data point, and in FIG. 3 (for example in the block 304).

At block 512, the generated transformation vector (Tc) may be applied on the seed data point to generate the transformed data point. In some embodiments, the processor 204 may be configured to control the genetic model 104 to apply the generated transformation vector (Tc) on the seed data point to generate the transformed data point. The processor 204 or the genetic model 104 may be configured to execute one or more operations (related to the realistic variations) on the seed data point to apply the generated transformation vector (Tc) to generate one transformed data point. The one or more operations are executed as per the random generated transformation values included in the transformation vector (Tc) for each realistic variation, as described with example in FIG. 3 (for example in block 304) for the mutation genetic operation. Control passes to block 524.

At block 514, a first transformation vector (Tc') may be extracted for the seed data point. In some embodiments, the processor 204 may be configured to control the genetic model 104 to extract the first transformation vector (Tc') for the seed data point. The seed data point may be the first (or original) data point received from the training dataset or the seed data point (i.e. best-fit data point) reselected from previous epoch as described in block 314 in FIG. 3.

The first transformation vector (Tc') may be extracted from the range of values predefined for the corresponding realistic variation, as mentioned in Table 2 considering the data point is an image. In some embodiments, the processor 204 or the genetic model 104 may randomly generate each transformation value of the first transformation vector (Tc'), where each transformation value may lie within the range of values predefined for the corresponding realistic variation of Table 2, considering the data point is an image. In some embodiments, either of the processor 204, the genetic model 104, or the population generator 106 may generate the transformation values for current epoch based on the generated transformation values for the population in the previous epoch such that the absolute value of each transformation value may still remain within the range of predefined value of Table 2, as described in detail, for example, in the block 306 of FIG. 3.

At block 516, a second best-fit data point may be determined from previous epoch. In some embodiments, the processor 204 may be configured to determine the second best-fit data point or the transformed data point in the population of previous epoch. In some embodiments, the processor 204 may receive the second best-fit data point from the fitness evaluator 108. The second best-fit data point may be a data point which when input to the DNN 110 provides second lowest output value or second highest error value in the population of previous epoch. In another embodiment, the second best-fit data point may be a data point which when input to the DNN 110, may exhibit second highest structural neural network coverage among all the structural neural network coverages determined for the population in the previous epoch.

At block 518, a second transformation vector (Tc") may be extracted for the determined second bit-fit data point. In some embodiments, the processor 204 may be configured to control the genetic model 104 to extract the second transformation vector (Tc") for the second bit-fit data point determined from the population of the previous epoch. In some embodiments, the processor 204 or the genetic model 104 may randomly generate each transformation value for the second transformation vector (Tc"), where each transformation value may lie within the range of values predefined for the corresponding realistic variation of Table 2, considering the data point is an image. In some embodiments, the processor 204 or the genetic model 104 may generate the transformation values for the second best-fit data point in the current epoch based on the generated transformation values for the population in the previous epoch such that the absolute value of each transformation value may still remain within the range of predefined values of Table 2, as described in detail, for example, in block 306 of FIG. 3.

At block 520, a first set of transformation values may be selected from the first transformation vector (Tc') and a second set of transformation values may be selected from the second transformation vector (Tc"). In some embodiments, the processor 204 may control the genetic model 104 to select the first set of transformation values from the first transformation vector (Tc') and select the second set of transformation values from the second transformation vector (Tc") to construct the transformation vector (Tc).

Example of the first transformation vector (Tc') for the realistic variations related to image as the data point is presented in Table 3, as follows:

TABLE 3

Example of first transformation vector (Tc')

| Rotation ($R_1$) | Horizontal translation ($T1_1$) | Vertical Translation ($T2_1$) | Shear ($S_1$) | Zoom ($Z_1$) | Brightness ($B_1$) | Contrast ($C_1$) |
| --- | --- | --- | --- | --- | --- | --- |
| +2 | +1 | 0 | 0 | +0.1 | −2 | 0 |

Example of the second transformation vector (Tc") for the realistic variations related to image as the data point is presented in Table 4, as follows:

TABLE 4

Example of second transformation vector (Tc")

| Rotation ($R_2$) | Horizontal translation ($T1_2$) | Vertical Translation ($T2_2$) | Shear ($S_2$) | Zoom ($Z_2$) | Brightness ($B_2$) | Contrast ($C_2$) |
| --- | --- | --- | --- | --- | --- | --- |
| +3 | 0 | −2 | +0.05 | +0.2 | −1 | +2 |

Example of the constructed transformation vector (Tc) for the realistic variations related to image as the data point is presented in Table 5, as follows:

TABLE 5

Example of constructed transformation vector (Tc)

| Rotation ($R_1$) | Horizontal translation ($T1_1$) | Vertical Translation ($T2_1$) | Shear ($S_1$) | Zoom ($Z_2$) | Brightness ($B_2$) | Contrast ($C_2$) |
| --- | --- | --- | --- | --- | --- | --- |
| +2 | +1 | 0 | 0 | +0.2 | −1 | +2 |

As shown in Tables 5 and 6, a total size of the first transformation vector (Tc') and the second transformation vector (Tc") is same (for example 7). In some embodiments, the processor 204 or the genetic model 104 may be configured to select the first set of transformation values (for example as $R_1$, $T1_1$, $T2_1$, and $S_1$ in Table 5) from the first transformation vector (Tc') and select the second set of transformation values (for example as $Z_2$, $B_2$, and $C_2$ in Table 5) to construct the transformation vector (Tc). The constructed transformation vector (Tc) may include the transformation values (for example s $R_1$, $T1_1$, $T2_1$, $S_1$, $Z_2$, $B_2$, and $C_2$) as shown in Table 6.

In some embodiments, a first number (or first size) of the first set of transformation values and a second number (or second size) of the second set of transformation values may be different to construct the transformation vector (Tc). For example, as per Table 6, the first number is 4 and the second number is 3. The total size of the first size and second size may be equal to the actual size of the first second transformation vector (Tc') or the second transformation vector (Tc"). In another embodiment, the first number (or first size) of the first set of transformation values and the second number (or second size) of the second set of transformation values may be same depending on the number of realistic variations applicable for a particular type of data points (for example speech or text) or a particular type of the real-time application.

At block 522, the constructed transformation vector (Tc) may be applied on the seed data point to generate the transformed data point. In some embodiments, the processor 204 may be configured to control the genetic model 104 to apply the constructed transformation vector (Tc) on the seed data point (i.e. received at the block 502) to generate the transformed data point, as described in detail in FIG. 3 (for example in the block 304).

In some embodiments, the extraction of the first transformation vector (Tc'), the extraction of the second transformation vector (Tc"), the selection of the first set of transformation values and the second set of transformation values to construct the transformation vector (Tc), and the generation of transformed data point based on the constructed transformation vector (Tc) may correspond to the crossover genetic operation of the genetic model 104 as shown in FIG. 4.

At block 524, it may be verified whether the generated transformed data point of the seed data point satisfies a predefined transformation criteria. In some embodiments, the processor 204 may be configured to verify whether the generated transformed data point satisfies the predefined transformation criteria. For example, the processor 204 may verify whether the generated transformed data point is also realistic similar to the seed data point received at block 502. In cases, where the generated transformed data point does not satisfy the predefined transformation criteria, the processor 204 may discard the transformed data point and passes control to block 506 to generate another transformed data point based on either the mutation genetic operation (i.e. blocks 510 to 512) or the crossover genetic operation (blocks 514 to 522). Otherwise the control passes to block 526.

At block 526, the verified transformed data point may be added to the population of current epoch. In some embodiments, the processor 204 may add the transformed data point (verified at block 524) into the population of data points of current epoch. The processor 204 may be further configured to increase current size of the population by one instance.

At block 528, it may be determined whether a current size of the population of data point is lesser than the predefined size of populations of data point. The predefined size may indicate a number of transformed data points may be required to be added in the population before identifying the best-fit data point in the population of data points genetically generated. In case the current size is lesser than the predefined size of the population, the control passes to block 506 to generate another transformed data point of the population. Otherwise, the control passes to block 528.

At block 530, the population of data points may be obtained. The population of data point may include the plurality of transformed data points generated by iteratively performing the operations from block 506 to block 528 until the current size of the population reaches the predefined size of population of current epoch. In some embodiments, the generated population of data points may also include the seed data point (received at block 504) along with the plurality of transformed data points. The generated population of data points may include a first set of transformed data points generated based on the mutation genetic operation of the genetic model 104 and may include a second set of transformed data points generated based on the crossover genetic operation of the genetic model 104. In some embodiments, the number of the first set and second set of transformed data points in the population depends on the random function executed at block 506. In some embodiments, at each iterative process of blocks 506 to 528, the generated transformation vector (Tc) may be different, however the absolute transformation values in the transformation vector (Tc) may lie with the ranges predefined for corresponding realistic variation of the plurality of realistic variations as described, for example, in block 306 of FIG. 3.

Control passes to end. Although the flowchart 500 is illustrated as discrete operations, such as 502, 504, 506, 508, 510, 512, 514, 516, 518, 520, 522, 524, 526, 528, and 530. However, in certain embodiments, such discrete operations may be further divided into additional operations, combined into fewer operations, or eliminated, depending on the particular implementation without detracting from the essence of the disclosed embodiments.

Figure 6:
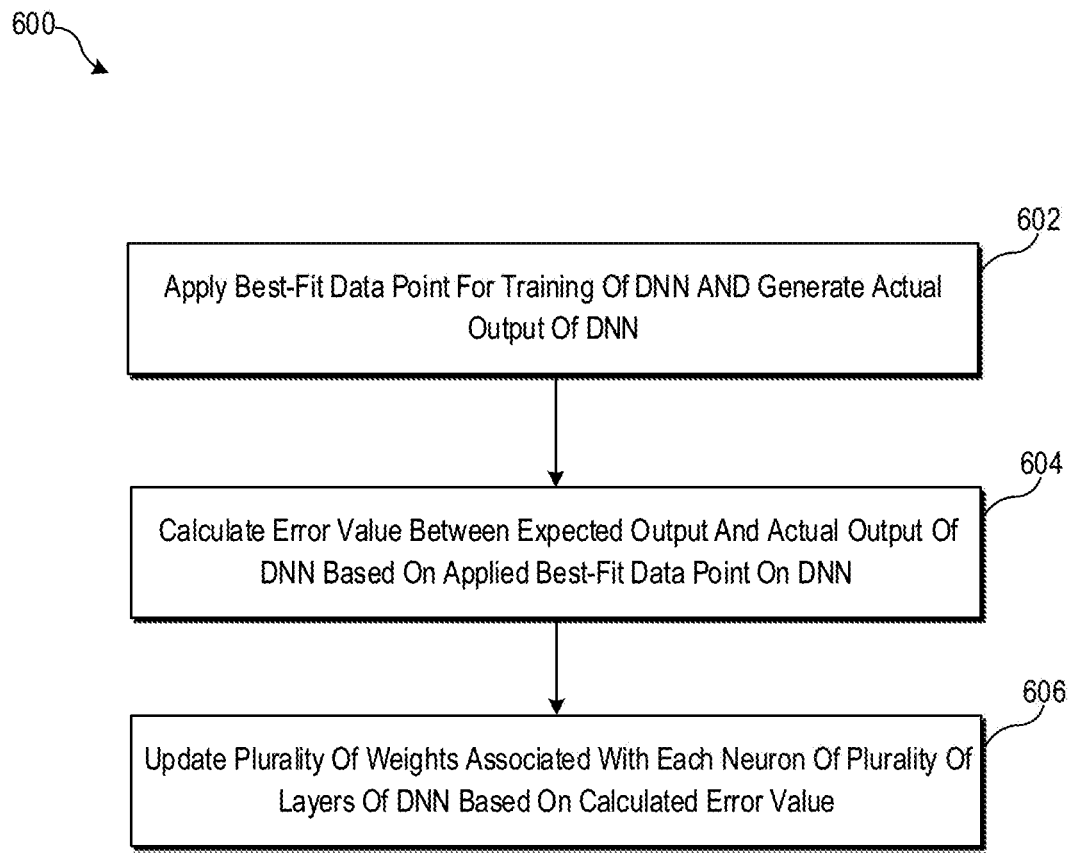
FIG. 6 is a flowchart of an example method for executing training operation of the deep neural network (DNN), all according to at least one embodiment described in the present disclosure.

FIG. 6 is a flowchart of an example method for executing training operation of the deep neural network (DNN), according to at least one embodiment described in the present disclosure. FIG. 6 is explained in conjunction with elements from FIG. 1, FIG. 2, FIG. 3, FIG. 4, and FIGS. 5A-5B. With reference to FIG. 6, there is shown a flowchart 600. The method illustrated in the flowchart 600 may start at 602 and may be performed by any suitable system, apparatus, or device, such as by the example electronic device 102 of FIG. 1 or the example system 202 of FIG. 2. For example, one or more of the electronic device 102 and the DNN 110 may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

At 602, a best-fit data point may be applied for training of the DNN 110. In some embodiments, the processor 204 may be configured to apply the best-fit data point for training of the DNN 110. The best-fit data point may be determined from the generated population at each epoch with respect to the first data point which may be selected from the training dataset as described in detail, for example, in FIG. 3. In some embodiments, the DNN 110 may apply the best-fit data point on the DNN 110 to generate an actual output of the DNN 110.

At block 604, an error value may be calculated between an expected output and the actual output of the DNN 110 based on the applied best-fit data point on the DNN 110. The expected output may an output (for example probability output value) of the DNN 110 when the first data point is correctly recognized (or classified) by the DNN 110. The best-fit data point may be a transformed data point which may be the most lossy data point causing best structural neural network coverage in the DNN 110. In some embodiments, the processor 204 may be configured to calculate the error value between the expected output of the first data point (i.e. seed data point) and the actual output of the DNN 110 based on the applied best-fit data point on the DNN 110.

At block 606, a plurality of weights associated with each neuron of a plurality of layers of the DNN 110 may be updated based on the calculated error value. In some embodiments, the processor 204 may control the DNN 110 to update the plurality of weights associated with each neuron of the plurality of layers of the DNN 110. The DNN 110 may continuously update the plurality of weights until the DNN 110 provides the expected output for the applied best-fit data point substantially similar to that of the first data point, or the DNN 110 may be completely trained on the best-fit data point (i.e. transformed variation) to be recognized as the first data point in the training dataset.

Control passes to end. Although the flowchart 600 is illustrated as discrete operations, such as 602, 604, and 606. However, in certain embodiments, such discrete operations may be further divided into additional operations, combined into fewer operations, or eliminated, depending on the particular implementation without detracting from the essence of the disclosed embodiments.

In some embodiments, the disclosed electronic device 102 may train the DNN 110 for each data point in the training dataset based on aforementioned operations mentioned in the methods 300, 500, and 600. The DNN 110 once trained on various genetic mutants of the data points in the training dataset, may not only provide an effective data augmentation and may also provide an enhanced accuracy in the recognition or classification of different variations of the data points as compared to certain conventional solutions.

An exemplary experiment data observed for a DNN trained by the disclosed genetically controlled data augmentation method (for example for three realistic variations such as rotation, translation, and shear for image as data point) over conventional methods is presented in Table 7, as follows:

TABLE 7

Measured Accuracy of disclosed method of data augmentation using Genetic Model over Conventional Methods

| Augmentation Strategy | Measured accuracy of trained DNN for three realistic variations (under grid attack) | Measured accuracy of trained DNN for six realistic variations (under grid attack) |
| --- | --- | --- |
| No Augmentation | 0.7% | .7% |
| Conventional Methods | 76.9%-83.7% | 42%-59% |
| Disclosed data augmentation using Genetic Model | 88.8% | 67.3% |

From Table 7, it may be observed that the accuracy of the DNN trained based on the disclosed method of data augmentation using the genetic model may provide approximately 5% higher accuracy in comparison to the accuracy provided by the DNN trained using the conventional methods under grid attack. It should be noted that data provided in Table 7 may merely be taken as experimental data and may not be construed as limiting the present disclosure.

Although the disclosure describes the use of genetic model to perform stochastic search for suitable variants of training data for a data augmentation regime of training the DNN. However, in some embodiments, other meta-heuristic methods, such as, but are not limited to, simulated annealing, particle swarm optimization, and tabu search, may be implemented, without a deviation from scope of the disclosure.

Various embodiments of the disclosure may provide one or more non-transitory computer-readable storage media configured to store instructions that, in response to being executed, cause a system (such as the example system 202) to perform operations. The operations may include operations may include selecting, from a training dataset of a plurality of data points which may be associated with a real-time application, a first data point as a seed data point. The operations may further include performing a set of first operations for training a Deep Neural Network (DNN) for a specific classification task of the real-time application. The performing of the set of first operations may include generating a population of data points by application of a genetic model on the selected seed data point. The population of data points may include the selected seed data point and a plurality of transformed seed data points of the selected seed data point. The performing of the set of first operations may further include determining a best-fit data point in the generated population of data points based on application of a fitness function on each data point in the generated population of data points. The performing of the set of first operations may further include executing a training operation on the DNN based on the determined best-fit data point and reselecting the determined best-fit data point as the seed data point. The operations may further include obtaining a trained DNN by iteratively performing the set of first operations for a plurality of epochs based on the reselected seed data point.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    selecting, from a training dataset of a plurality of data points which are associated with a real-time application, a first data point as a seed data point;
    performing a set of first operations for training a Deep Neural Network (DNN) for a specific classification task of the real-time application, the performing the set of first operations comprises:
        generating a population of data points by application of a genetic model on the selected seed data point,
            wherein the population of data points comprises the selected seed data point and a plurality of transformed data points of the selected seed data point,
        determining a best-fit data point in the generated population of data points based on application of a fitness function on each data point in the generated population of data points,
        executing a training operation on the DNN based on the determined best-fit data point, and
        reselecting the determined best-fit data point as the seed data point; and
    obtaining a trained DNN for the first data point by iteratively performing the set of first operations for a plurality of epochs based on the reselected seed data point.

2. The method according to claim 1, wherein a number of the plurality of epochs for training the DNN is predefined.

3. The method according to claim 1, the application of the genetic model on the selected seed data point further comprising:
    performing a set of second operations for generating the plurality of transformed data points in the population of data points, wherein the performing of the set of second operations further comprises:
        executing a random function to generate a random number, and
        executing one of a mutation genetic operation or a crossover genetic operation based on the generated random number; and
    generating the plurality of transformed data points of the selected seed data point based on iteratively performing the set of second operations for a predefined size of the population of data points.

4. The method according to claim 3, wherein the execution of the mutation genetic operation further comprising:
    generating a transformation vector associated with a plurality of realistic variations of the selected seed data point, wherein each transformation value in the transformation vector is within a range predefined for the corresponding realistic variation of the plurality of realistic variations, applying the generated transformation vector on the selected seed data point, generating a transformed data point based on the applied transformation vector on the selected seed data point, verifying the generated transformed data point based on a predefined transformation criteria, and adding the transformed data point into the population of data points based on the verification.

5. The method according to claim 4, wherein the transformation vector associated with the plurality of realistic variations is randomly generated for each of the plurality of epochs for training the DNN.

6. The method according to claim 3, wherein the execution of the crossover genetic operation further comprising:

extracting a first transformation vector associated with a plurality of realistic variations of the selected seed data point with respect to the first data point, wherein each transformation value in the first transformation vector is within a range predefined for the corresponding realistic variation of the plurality of realistic variations, determine a second best-fit data point in the generated population of data from previous epoch of the plurality of epochs, extracting a second transformation vector associated with the plurality of realistic variations of the determined second best-fit data point, wherein each transformation value in the second transformation vector is within the range predefined for corresponding realistic variation of the plurality of realistic variations, selecting a first set of transformation values from the first transformation vector and a second set of transformation values from the second transformation vector to construct a transformation vector, applying the constructed transformation vector on the selected seed data point to generate a transformed data point, verifying the generated transformed data point based on a predefined transformation criteria, and adding the transformed data point into the population of data points based on the verification.

7. The method according to claim 6, wherein a first number of the selected first set of transformation values and a second number of the selected second set of transformation values are same to construct the transformation vector.

8. The method according to claim 6, wherein a first number of the selected first set of transformation values and a second number of the selected second set of transformation values are different to construct the transformation vector.

9. The method according to claim 1, wherein the plurality of data points correspond to one of image data, audio data, or text data.

10. The method according to claim 1, wherein the real-time application comprises one of an image classification, a speech recognition, or text recognition.

11. The method according to claim 10, wherein a plurality of realistic variations for the real-time application as the image classification comprise one of a rotation variation, a horizontal translation variation, a vertical translation variation, a shear variation, a zoom variation, a brightness variation, a contrast variation, a flip variation, a sharpness variation, or a color variation.

12. The method according to claim 10, wherein a plurality of realistic variations for the real-time application as the speech recognition comprise one of a rate-of-speech variation, a loudness variation, a type of ambient noise variation, a tempo variation, a pitch variation, a tone variation, an intonation variation, a voice quality variation, a phonetic variation, or a pronunciation variation.

13. The method according to claim 10, wherein a plurality of realistic variations for the real-time application as the text recognition comprise one of a font-size variation, a font-type variation, a rotation variation, a font-color variation, a background color variation, or a texture variation.

14. The method according to claim 1, wherein the evaluating the fitness function further comprising:

determining a most lossy data point in the generated population of data points, and determining the best-fit data point in the generated population of data points based on the determined most lossy data point.

15. The method according to claim 14, further comprising:

calculating an output probability value of the DNN for each data point in the generated population of data points, and determining the most lossy data point in the generated population of data points based on the calculated output probability value for each data point in the generated population of data points.

16. The method according to claim 1, wherein the evaluating the fitness function further comprising:

determining a structural neural network coverage of the DNN for each data point in the generated population of data points, and determining the best-fit data point in the generated population of data points based on the determined structural neural network coverage for each data point in the generated population of data points.

17. The method according to claim 1, wherein the executing of the training operation further comprising:

applying the determined best-fit data point in the generated population of data points on the DNN to generate an actual output of the DNN, calculating an error value between an expected output and the actual output of the DNN based on the applied best-fit data point on the DNN, and updating a plurality of weights assigned for each neuron of a plurality of layers of the DNN based on the calculated error value.

18. One or more non-transitory computer-readable storage media configured to store instructions that, in response to being executed, cause a system to perform operations, the operations comprising:

selecting, from a training dataset of a plurality of data points which are associated with a real-time application, a first data point as a seed data point;

performing a set of first operations for training a Deep Neural Network (DNN) for a specific classification task of the real-time application, the performing the set of first operations comprises:

generating a population of data points by application of a genetic model on the selected seed data point, wherein the population of data points comprises the selected seed data point and a plurality of transformed data points of the selected seed data point, determining a best-fit data point in the generated population of data points based on application of a fitness function on each data point in the generated population of data points, executing a training operation on the DNN based on the determined best-fit data point, and reselecting the determined best-fit data point as the seed data point; and obtaining a trained DNN for the first data point by iteratively performing the set of first operations for a plurality of epochs based on the reselected seed data point.

19. The one or more computer-readable storage media according to claim 18, wherein a number of the plurality of epochs for training the DNN is predefined.

20. A system, comprising:

a Deep Neural Network (DNN); and a processor, coupled with the DNN, configured to:

select, from a training dataset of a plurality of data points which are associated with a real-time application, a first data point as a seed data point;

perform a set of first operations for training the DNN for a specific classification task of the real-time application, wherein to perform the set of first operations, the processor is further configured to:

generate a population of data points by application of a genetic model on the selected seed data point, wherein the population of data points comprises the selected seed data point and a plurality of transformed data points of the selected seed data point, and determine a best-fit data point in the generated population of data points based on application of a fitness function on each data point in the generated population of data points, provide the determined best-fit data point to the DNN for a training operation of the DNN, and reselect the determined best-fit data point as the seed data point; and iteratively perform the set of first operations for a plurality of epochs of training of the DNN based on the reselected seed data point to obtain a trained DNN for the first data point.

* * * * *